June 5, 1945.  A. F. ALLWEIN  2,377,474

MEASURING INSTRUMENT

Filed March 25, 1943  4 Sheets-Sheet 1

INVENTOR.
ALOYSIUS F. ALLWEIN
BY
B. Spangenberg
ATTORNEY.

June 5, 1945.  A. F. ALLWEIN  2,377,474
MEASURING INSTRUMENT
Filed March 25, 1943  4 Sheets-Sheet 3

INVENTOR.
ALOYSIUS F. ALLWEIN
BY
C. B. Spangenberg
ATTORNEY.

June 5, 1945.   A. F. ALLWEIN   2,377,474

MEASURING INSTRUMENT

Filed March 25, 1943   4 Sheets-Sheet 4

INVENTOR.
ALOYSIUS F. ALLWEIN
BY
CB Spangenberg
ATTORNEY.

Patented June 5, 1945

2,377,474

UNITED STATES PATENT OFFICE 2,377,474

MEASURING INSTRUMENT

Aloysius F. Allwein, Philadelphia, Pa., assignor to The Brown Instrument Company, Philadelphia, Pa., a corporation of Pennsylvania Application March 25, 1943, Serial No. 480,581

12 Claims. (Cl. 234—1.5)

The present invention relates to measuring instruments, and particularly to measuring instruments of the multiple self-balancing potentiometer type and to means for automatically recalibrating or standardizing them at periodic intervals.

As is well known the voltage supply for most potentiometer instruments is derived from a dry cell. While such a source is substantially constant, there is, over a period of time, a decrease in the voltage produced. Such a decrease will not prevent the instrument from balancing itself, but will cause the balance point to be inaccurate. Periodically, therefore, a resistance in series with the dry cell is adjusted to bring the potential drop across the slide-wire to some standard value in order to maintain the accuracy of the instrument.

It is an object of this invention to provide a simplified means for adjusting the standardizing resistance of a potentiometer circuit. It is a further object of the invention to have the standardizing resistance of a potentiometer circuit adjusted by means of the same power device which serves to drive the marking element across the chart, and which driving mechanism is operated whenever an unbalanced condition of the potentiometer circuit occurs. It is a further object of the invention to provide potentiometer standardizing means which is automatically operated at periodic intervals to standardize the potentiometer circuit. It is a further object of the invention to prevent a record of the condition being measured from being made during the time that a standardizing operation is taking place.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention. In the drawings:

Figures 1, 2:
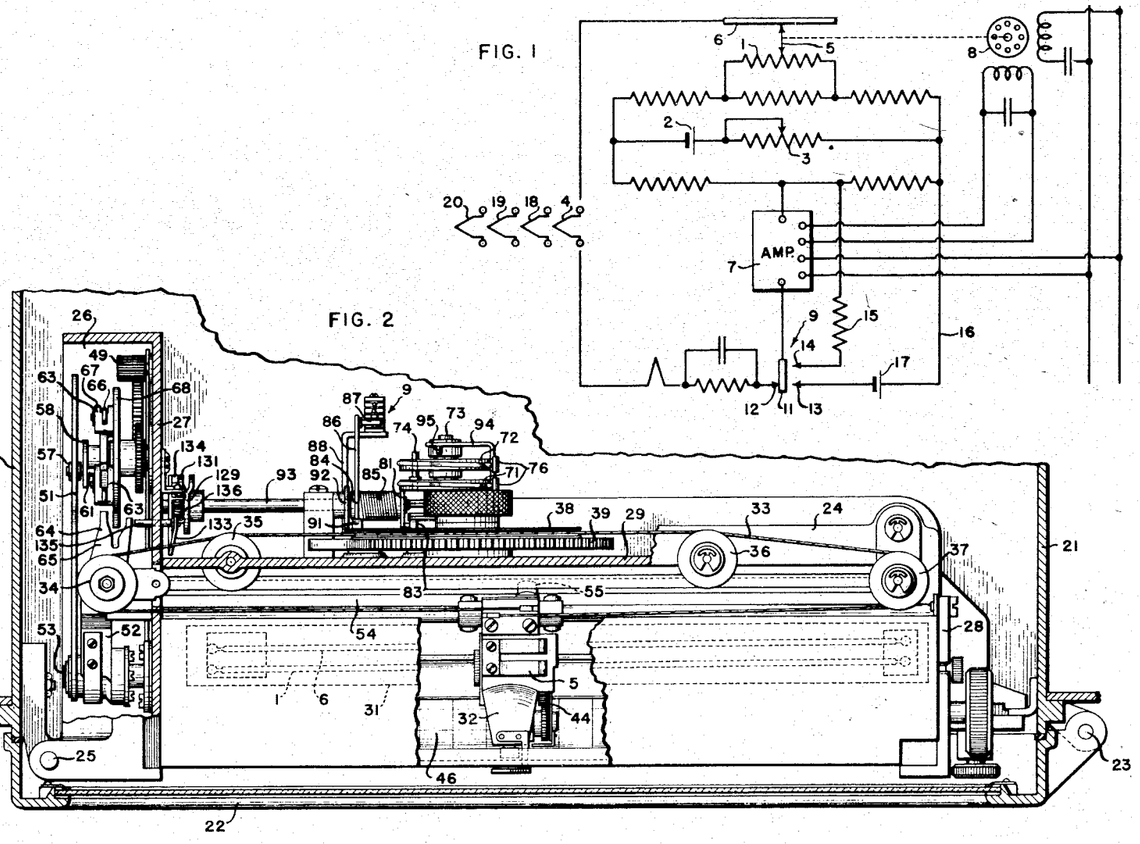
Figure 1 is a wiring diagram of a multiple potentiometer circuit.
Figure 2 is a top view partly in section of the drive mechanism for the print wheel of the potentiometer.

In Figure 1 there is shown a typical potentiometer circuit in which there is a slide-wire 1 that has a potential impressed across it by a battery 2 to produce a predetermined voltage drop; the battery preferably being in the form of a dry cell. Connected in circuit with the battery is a variable resistance 3 that is used to maintain constant the potential drop in the circuit as the battery diminishes in power in order to maintain the system in calibration. The voltage from a thermocouple 4 is impressed across a portion of the slidewire 1 as determined by the position of a contact 5 between the slidewire and a parallel collector bar 6. As the thermocouple temperature changes, the potentiometer circuit becomes unbalanced and this in turn is detected by a vibrator and amplifier unit 7 to energize a motor 8 to shift the contact 5 along the slide-wire in the proper direction and amount in order to rebalance the potentiometer circuit. The details of the vibrator and amplifier are disclosed in the co-pending application of Walter P. Wills, Serial No. 421,173, and which was filed on December 1, 1941, and they are characterized by the ability to continuously energize the motor 8 for rotation in the proper direction whenever the potentiometer circuit is unbalanced.

The thermocouple is normally connected in the circuit by means of a switch 9 which consists of a movable contact 11 that is directly connected to the amplifier and a stationary contact 12 that is connected to the thermocouple. This switch is also provided with stationary contact 13 that is connected to the potentiometer network, and stationary contact 14, that is used to insert a shunt resistance 15 around the amplifier at such times as the potentiometer circuit is being standardized. In the wire 16 between the contact 13 and the potentiometer network there is located a standard cell 17 which is used to impress a standard potential drop across a portion of the potentiometer network at such times as the network is being recalibrated or standardized.

In the operation of a potentiometer network of the type disclosed above, upon the occurrence of a change in temperature of a thermocouple 4 the potentiometer circuit will be unbalanced to produce a current flow in one direction or the other through the vibrator which is included along with the amplifier and designated as 7. The vibrator and amplifier will detect this unbalance, its direction and amount, and correspondingly energize the motor 8 for rotation in the proper direction. This motor is mechanically connected, in a manner to be described, with the contact 5 so that the latter is shifted along the slide-wire 1 and collector 6 to a position in which the potentiometer circuit is again rebalanced and no current flows through the unit 7.

Due to the fact that the strength of the battery 2 gradually diminishes with use it becomes necessary to adjust the resistance 3 from time to time in order to maintain the calibration of the instrument. At such times as the instrument is to be recalibrated or standardized, the movable contact 11 of the switch 9 is shifted to the right to disconnect the thermocouple from the circuit and to insert the standard cell 17 across a portion thereof and to simultaneously insert the shunt 15 around the unit 7. If the circuit needs recalibration a current flow will be produced through the unit 7 in a manner similar to that produced by the thermocouple 4, producing an energization of the motor 8 to rotate this motor in a direction and an amount proportional to the potentiometer unbalance at that time. This rotation of the motor is used to adjust the amount of the resistance 3 which is inserted in the circuit.

In some cases the potentiometer instrument is designed to measure sequentially the value of a number of temperautres as measured by thermocouples subjected thereto. To this end, there is shown in Figure 1 a series of thermocouples 18, 19 and 20 in addtion to the thermocouple 4 which may be connected in the potentiometer circuit one after another in any conventional manner by means of a suitable thermocouple switch. The invention in this case is particularly directed to the potentiometer standardizing mechanism per se and this mechanism in combination with the remainder of the potentiometer structure. The potentiometer mechanism shown herein is of the type disclosed in detail and claimed in the application of J. A. Caldwell, Serial No. 447,863, which was filed on June 20, 1942, and reference is accordingly made to that case for details of the potentiometer structure which are not shown herein and which form no part of the present invention.

Figures 3, 4, 5:
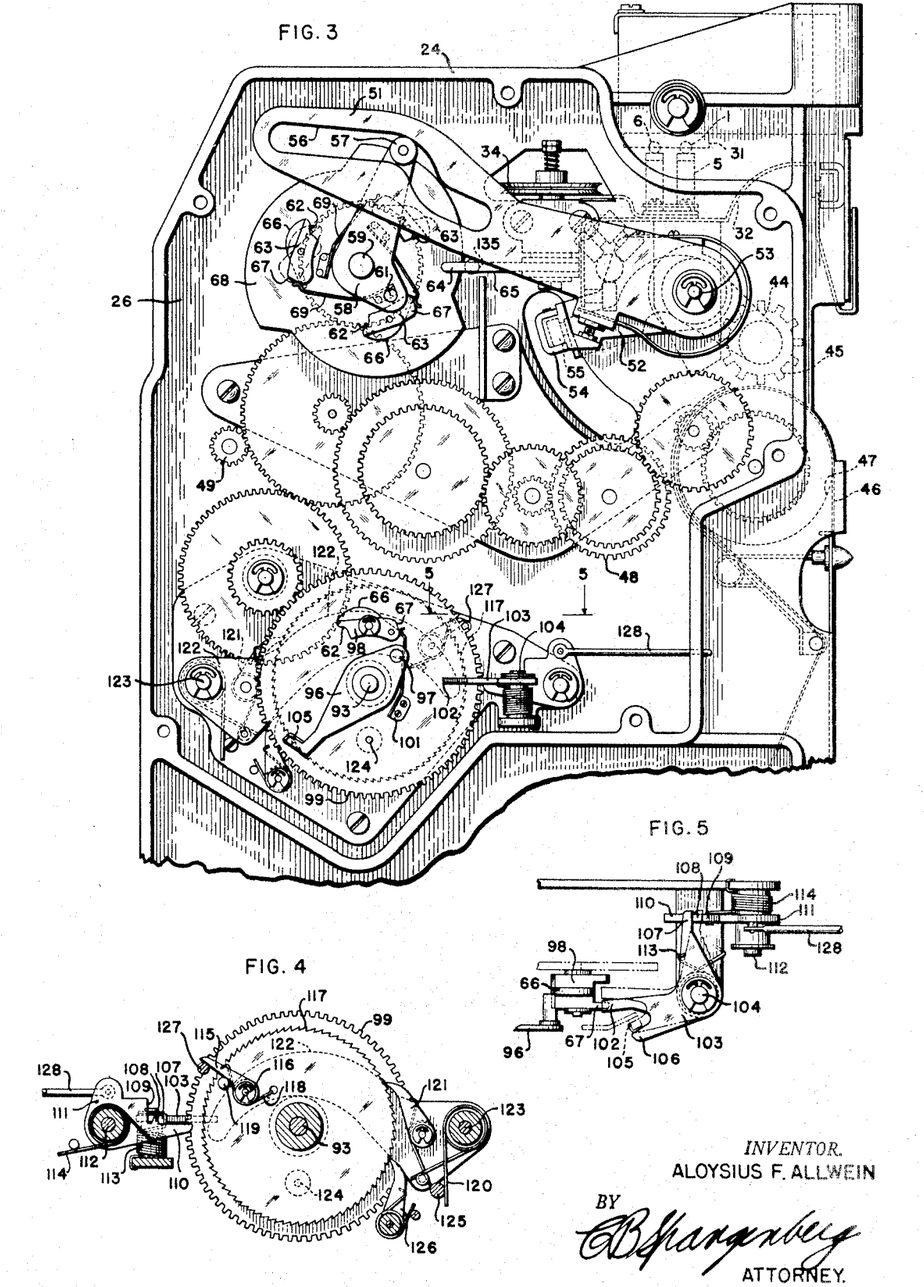
Figure 3 is a side view showing the print wheel actuating mechanism and the standardizing mechanism.
Figure 4 is a view showing the timing means for the standardizing mechanism.
Figure 5 is a view taken on line 5—5 of Figure 3.
Figure 6:
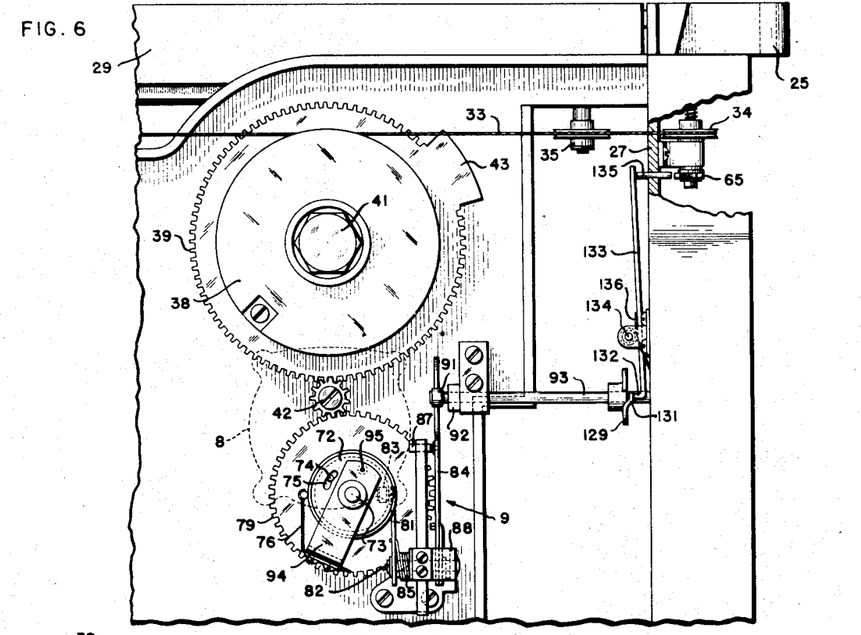
Figure 6 is a back view of a portion of the instrument showing the standardizing resistances.

Referring to Figures 2, 3 and 6, there is shown broken away an instrument casing 21 in which the entire potentiometer mechanism is located. This casing is provided with a door 22 that is hinged at 23 and may be swung out of the way to give access to the structure to be presently described. A casting 24 upon which the potentiometer structure is mounted is hinged at 25 in the casing, and may be swung from the position shown out of the casing when the door 22 is opened, to give access to the structure carried thereby for adjustment and repair. The casting 24 is provided with a compartment 26 on its left side, and with side plates 27 and 28 that are joined by a connecting wall 29. The support 31 for the slidewire 1 is mounted between the side plates 27 and 28, and carries this slidewire along with the collecting bar 6 on the lower side thereof as is shown best in Figure 3. Beneath the slide-wire and suitably mounted for sliding movement across the instrument is a print wheel carriage 32 which has attached to and insulated from its upper surface the contact 5 so that this contact may engage the slide-wire and the collector bar as the carriage 32 is moved transversely of the instrument.

The print wheel carriage is driven by means of a cable 33 which has its ends attached to the carriage, and which passes over pulleys 34, 35, 36 and 37, the latter of which is biased in a counter-clockwise direction in order to take up any slack in the cable. The cable 33 is driven by a large pulley 38 as shown in Figure 6. This pulley is attached to a gear 39 that is mounted for rotation on the shaft 41, and the pulley and the gear are driven together by means of a pinion 42 that is on the shaft of motor 8. This motor is mounted beneath the print wheel carriage and on the front portion of the wall 29, while the pinion 42 extends to the rear of this wall where it meshes with the gear 39 and the structure carried thereby. The gear 39 is provided with a portion 43 that acts as a stop when it engages one side or the other of the pinion 42, to prevent the motor 8 from driving the print wheel carriage and the contact carried thereby beyond the ends of the slide wire in either direction.

The operation of the instrument is such that when an unbalance in the potentiometer circuit occurs the motor 8 will be rotated in the proper direction to drive gear 39 and pulley 38 so that the cable wrapped around the pulley will shift the print wheel carriage transversely between the side plates of the instrument casting. As the print wheel carriage moves, the contact 5 carried thereby will be moved along the slide-wire 1 until the potentiometer circuit is rebalanced, at which time the motor will stop.

The print wheel carriage has pivoted in it a support 44 upon which is mounted a print wheel 45. This support is moved in a manner to bring the print wheel into and out of engagement with a chart 46 to make an impression on that chart corresponding to the value of the temperature being measured at that time by the instrument. The chart is fed from a supply roll that is not shown over a chart drum 47, and is supplied to a chart take-up roll that is also not shown. The chart drum 47 is driven at a suitable speed by means of a train of gears 48 that is in turn driven from a pinion 49 which is connected to the shaft of a suitable constant speed drive motor. In the operation of the instrument, the motor 8 serves, through connections previously described, to shift the print wheel carriage transversely of the instrument to a position above the chart corresponding to the temperature which is then being measured. Thereafter the support 44 is moved in the print wheel carriage to bring the print wheel into engagement with the chart and is moved out of engagement with the chart. Simultaneously, the instrument is connected to another one of the thermocouples so that the rebalancing operation may be repeated.

The movement of the support 44 is accomplished by means of a compound lever 51, 52 that is oscillated around a shaft 53. As the compound lever oscillates the portion 52 moves a channel member 54 that is attached thereto and which extends transversely of the instrument. This channel member receives a roller 55 that is attached to the rear end of the support 44. Therefore, as the channel member is moved up and down the print wheel 45 will be moved into and out of engagement with the chart. The lever 51 is oscillated by means of engagement between a slot 56 formed therein and a roller 57 on the end of a crank 58 that serves to rotate a shaft 59 to which it is attached. The crank is rotated clockwise by means of engagement between a pin 61 on its short arm and a cut out portion 62 formed on one of the pawls 63 which are pivoted on a cam 68 that rotates around the shaft 59. In the position shown the pawls are in such a position that their cut out portions 62 are at a radial distance from the shaft 59 sufficient so that they can be moved past the pin 61 without engaging the same, but when any one of the pawls is rotated clockwise around its pivot from the position shown to the dotted line position shown with one of the pawls, the cut-out portion 62 will be moved radially inward to a position in which it will engage the pin 61 and rotate the crank 58 therewith. The pawls are moved from the position shown in solid lines into the dotted line position by means of engagement between the end 64 of a detector member 65 and a central raised portion 66 formed on the leading end of each pawl. The pawls are moved back from their dotted line position to the full line position by means of engagement between the end 64 and one or the other of raised portions 67 which are formed at the sides on the trailing end of each pawl. The detector member 65 is frictionally mounted for movement with the pulley 34 so that as this pulley rotates when the instrument is unbalanced and the print wheel carriage is being moved, the detector will be moved to one side or the other of the position shown in Figure 2. As shown, the cam 68 is a three lobe cam that is rotated around the shaft 59 in a clockwise direction by means of suitable gearing that is driven from the constantly rotating pinion 49. The pawls are held in their solid line or their dotted line positions by means of springs 69 which are attached to the cam 68 and engage the rear end of the pawls.

The cam 68 is continually rotated to bring its raised portions into the V-shaped opening formed in the detector member 65 to periodically bring this member to the position shown in Figure 2. If the instrument is unbalanced, and the pen carriage is being moved, passage of the cable 33 over pulley 34 will move the detector 65 to one side or the other of the midposition shown immediately after it has been straightened out by the cam 68. Each time the end 64 of the detector member is moved out of its central position it will be in the path of one of the portions 67 of the pawls to move the next pawl passing it to the full line position shown. If, however, the instrument has reached a balanced condition, the detector 65 will remain in its mid-position where it is moved by the cam 68 and the end 64 will then be in the path of the raised portion 66 of the next pawl moving past it. That pawl will then be moved to its dotted line position to bring the cutout portion 62 into the path of pin 61 and will therefore rotate crank 58. As the crank rotates roller 57 will move the compound lever 51, 52 first slightly clockwise to bring the print wheel into engagement with the chart, then counterclockwise, and then back to the position shown. During the movement of the lever, the instrument is connected to another thermocouple and will accordingly be unbalanced to start movement of the pen carriage again. As the pen carriage starts to move, the detector member 65 will be shifted to one side of the position shown in Figure 2 so that its end 64 will engage one of the projections 67 on the pawl which has been driving crank 58, and move this pawl to the full line position so that the crank will remain in the position of Figure 3 until such time as the instrument again reaches balance, and the above operation can be repeated.

Figure 7:
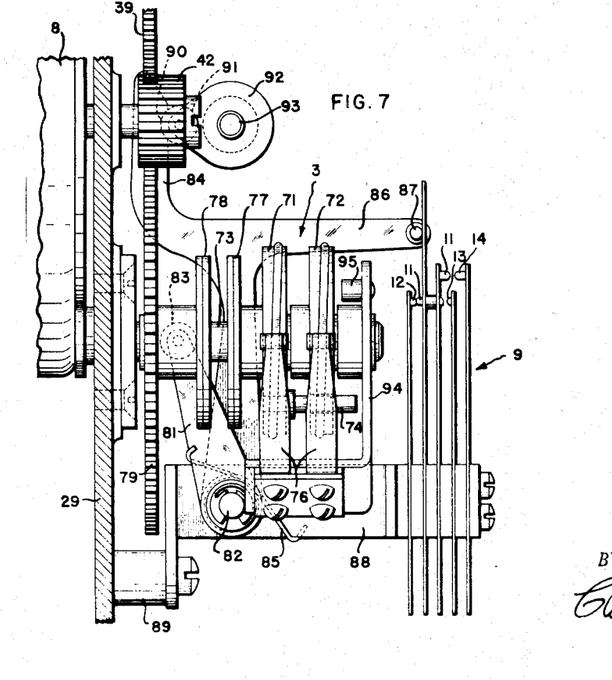
Figure 7 is a partial view taken from the left of Figure 6.
Figure 8:
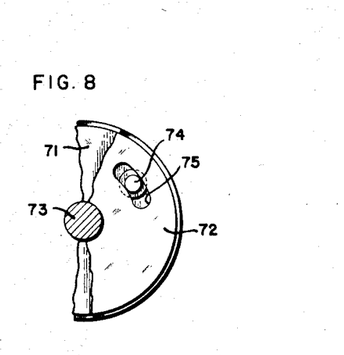
Figure 8 is a view showing the lost motion connection in the standardizing rheostat.

The standardizing resistance 3 which is shown diagrammatically in Figure 1 is shown in detail in Figure 7 as consisting of a vernier rheostat which is made of a fine resistance 71 and a coarse resistance 72 which resistances are rotatably mounted on a shaft 73 that extends rearwardly from the wall 29 of the mechanism supporting casting 24. The arrangement is, that the fine resistance is adjusted directly and the coarse resistance is rotated by the fine resistance by means of a pin 74 which is attached to the fine resistance 71 and extends rearwardly therefrom through a slot 75 that is formed in the resistance 72. The resistances are engaged by a split contact 76, which contact serves the purpose of connecting these resistances in the potentiometer circuit, and also by its frictional engagement with the resistance discs serves to prevent accidental rotation of the latter.

The resistances are adjusted relative to the contact 76 by means of a clutch which comprises a driven clutch disc 77 that is formed as a part of the resistance 71, and a driving clutch disc 78 which is also rotatably mounted on the shaft 73, and is attached to a gear 79. The gear 79 meshes with pinion 42 driven by the motor 8 so that as this motor rotates the gear and the driving disc 78 also rotate and at predetermined times, when the clutch discs 77 and 78 are in engagement with each other, serves to adjust the resistance 3. Driving disc 78 is moved into or out of engagement with driven disc 77 by means of a lever 81 that is attached to a shaft 82. The upper end of this lever has a roller 83 which engages the left face of the clutch disc to move this disc to the right into engagement with the disc 77, or the right face of gear 79 to separate the discs. During the movement of the disc 78, gear 79 will slide along the pinion 42, the latter being wide enough to permit this to take place. The shaft 82 also has attached to it a second lever 84; the two levers and shaft being biased in a clockwise, or clutch closing direction by means of a spring 85. The lever 84 also has an extension 86 projecting rearwardly from it which serves, by means of a pin 87, to throw the standardizing switch 9 from the position shown in Figure 1 to a position to bring contact 11 into engagement with contacts 13 and 14 whenever the clutch is closed. The switch 9 is shown in Figure 7 as being of a leaf type, and is mounted on a support 88 which is adapted to be fastened as shown at 89, to the wall 29 of the casting.

Normally speaking, during the operation of the instrument, the standardizing mechanism parts are in the position shown in Figure 7, and are held in that position by means of engagement between a roller 91 and a cut-out portion 90 on the upper end of lever 84. The roller 91 is mounted on a crank 92 that is attached to a shaft 93. This shaft is periodically rotated, in a manner presently to be described, so that the instrument may standardize itself. It is noted that the contacts 76 are supported on a member 94 that is attached to the outboard end of shaft 73. The support 94 also has a pin 95 projecting inwardly from it that serves as a stop to limit rotation of the resistance members 71 and 72. When the resistance members have rotated to one or the other of their limits pin 74 will engage pin 85 to stop their rotation.

The shaft is periodically rotated to permit a standardizing operation to take place by means of a crank 86 which is located in the right end of the shaft, as shown in Figure 6, and in the compartment 26 as shown in Figure 3. The crank 86 is driven by a pawl arrangement similar to that used to rotate the crank 58 which controls the printing operation. To this end, the crank 86 is provided with a pin 97 that is adapted to be engaged by a pawl 98 which is pivotally mounted on a gear 99. This pawl is provided with a cut-out driving portion 62 and raised portions 66 and 67, exactly like those portions which are formed on pawls 63. The gear 99 is driven in a counterclockwise direction in Figure 3 by means of suitable gearing between that gear and the constantly driven drive pinion 49. The pawl 98 is normally held in the position shown in Figure 3, in which position it will not engage the pin 97 to drive the crank. The pawl may be moved to a position to bring cut-out portion 62 radially inwardly so that it will engage the pin 97 and rotate the crank by means of the tip 102 of a lever 103 that is pivoted on a shaft 104. When the lever 103 moves to the dotted line position of Figure 5 its tip 102 will be in the path of projection 66, and upon engagement therewith will move the pawl 98 into driving engagement with pin 97, but when the lever is in the full line position of Figure 5, the pawl 102 will lie in the path of the outer one of the projections 67 to keep the pawl normally in its non-driving position. If the lever 103 has been moved to its dotted line position and the pawl 98 moved to the position in which it engages pin 97, an arm 106 formed on the lever will be in the path of a bent out portion 105 on the opposite end of crank 86. As the portion 105 passes arm 106 it will move the lever 103 counter-clockwise in Figure 5 so that the tip 102 thereof will be in the path of projection 67 of the pawl 98 to move the pawl out of its driving position.

The lever 103 is normally held in the full line position of Figure 5 by means of engagement between a portion 107 thereof and a stop lever 111 that is pivoted at 112. When the stop lever 111 is moved in a clockwise direction in Figure 4, or downwardly in Figure 5, the lever 103 can move clockwise in Figure 5 or to the left in Figure 4 so that its portion 107 will engage a surface 109 on to lever 111, thus permitting the lever 103 to move into its dotted line position. The lever 103 is normally biased in a clockwise direction in Figure 5 by means of a spring 113 so that the lever will tend to engage one of the portions 108 or 109. The stop lever 111 is normally biased in a counter-clockwise direction in Figure 4 by means of a spring 114 to keep this lever in engagement with the portion 107.

Lever 111 is periodically moved clockwise in Figure 4 to permit a standardizing operation to take place by means of engagement between the projection 110 of that lever and a pawl 115 that is pivoted at 116 on a ratchet 117. The pawl is biased by means of a spring 118 so that it normally engaged a pin 119 which also is attached to the ratchet 117. The ratchet is rotated in a counter-clockwise direction in Figure 4, and a clockwise direction in Figure 3 by means of a pawl 121 that is pivoted to a rocking lever 122. This latter is pivoted at 123 and is moved around its pivot against the action of a spring 120 by means of a pin 124 that projects from the gear 99. The arrangement is such that the ratchet and the gear are both freely rotatable on the shaft 93 with the driving lever 122 located between the two. The ratchet is driven in a direction opposite to that of the gear 99 so that the gear will not have any tendency to pull the ratchet ahead faster than it would normally be driven. The lever 122 is biased by its spring 120 into engagement with a stop pin 125. Adjusting this pin with respect to the pivot 123 will determine the amount of throw given to the lever 122 on each revolution of the gear 99. It is noted that holding pawl 126 engages the ratchet 117 to prevent retrograde movement of the latter. A pin 127 which lies in the path of the pawl 115 extends outwardly from the frame 27 and into the path of this pawl for a purpose to be later described. It is also noted that the holding lever 111 may be moved by a rod 128 which projects forwardly through the front of the frame, as well as by the pawl 115.

In the operation of the standardizing mechanism the gear 99 is rotated at a constant speed, and on each rotation thereof the pin 124 acting through lever 122 and pawl 121 serves to rotate the ratchet 117 for a predetermined distance. As the ratchet rotates, it will carry pawl 115 in a counter-clockwise direction in Figure 4 until this pawl engages the stationary pin 127. Thereafter, continued rotation of the ratchet 117 while the outer end of pawl 115 is held still, will cause the spring 118 to be tensioned. Eventually the ratchet will reach a position in which the end of the pawl will run off of the pin 117, and under the force of spring 118 this pawl will be moved downwardly into engagement with extension 110 of the holding lever 111. The blow that is given to this extension 110 by the pawl is sufficient to move the lever 111 against the force of its spring 114 to move projection 108 out of engagement with the extension 107 of the lever 103. Lever 103 may therefore turn clockwise in Figure 5 to its dotted line position with the extension 107 engaging surface 109. At this time the tip 102 of the lever is in a position to engage the projection 66 of the pawl 98. The pawl will accordingly be moved into its driving position to rotate the crank 86. As the crank is rotated, roller 91 on the opposite end of shaft 93 will be moved out of the low portion 90 on lever 84 to permit the standardizing operation, as previously described, to take place. The instrument will be in standardizing condition until such time as the crank 96 has made one complete rotation. When this occurs the portion 105 of the crank 96 will engage portion 106 of lever 103 to move the lever from its dotted line to its full line position of Figure 5, and thereby bring portion 107 to the left of the projection 108 in Figure 5. Spring 114 will thereupon move the stop lever 111 to a position in which 107 may engage 108. The parts will remain in this position until such time as the pawl 115 again engages the extension 110 to repeat the standardizing operation. The speed of rotation of gear 99 is such that the instrument will have sufficient time to standardize itself during one rotation of the gear and crank 92. The standardizing operation may also be performed manually by the operator by merely pushing the right end of rod 128 in Figure 3. This operation also moves the stop lever 111 clockwise in the Figure 4 so that lever 103 can turn from its full line to its dotted line position in Figure 5. Upon the next rotation of the gear 99 the instrument will standardize itself in the manner above described.

It is necessary to prevent a printing operation from taking place during the time that the instrument is being standardized in order to prevent an incorrect recording of the value of one of the conditions from being made. As far as the recording portion of the instrument is concerned, a record will be made each time the instrument comes to balance, but if the instrument has been standardized, and a record is made, the record will merely be of the standardizing, rather than the temperature of the thermocouple to which it is then connected. To prevent this from occurring, the printing mechanism is not operated during the time that standardizing takes place. This is accomplished by a means which holds the detecting member 65 in its out-of-balance position during such time as the standardizing switch is thrown and the standardizing clutch is closed. To this end, the shaft 93 is provided with a cam 129 having a raised portion 131 against which the tip 132 of a lever 133 normally bears. This lever is pivoted at 134 and biased in a clockwise direction in Figure 6 by a spring 136 so that its upper end will tend to move a pin 135 against the side of the detector member 65 to push this member out of its neutral position. The parts are in the position shown in Figure 6 when the instrument is being operated normally. When a standardizing operation takes place, however, rotation of the shaft 93 will move the raised portion 131 of cam 129 past the end 132 of lever 133. At this time, spring 136 will move the lever 133 so that its upper end will force pin 135 against the side of the detector member 65. As the cam 68 straightens the detector member out during its rotation, the cam lever 133 will merely be rocked around its pivot 134 against the tension of spring 136 by means of the action of pin 135. When the standardizing operation is completed, the cam 129 will have made one complete rotation to bring its high portion 131 back underneath the portion 132. Lever 133 is then held in a position in which it cannot act on the pin 135. The instrument can then operate in its usual manner.

Figure 9:
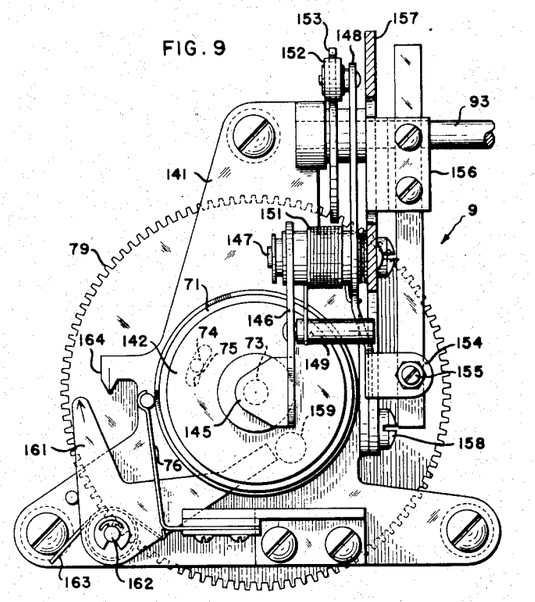
Figure 9 is a back view of a modified type of standardizing mechanism.
Figure 10:
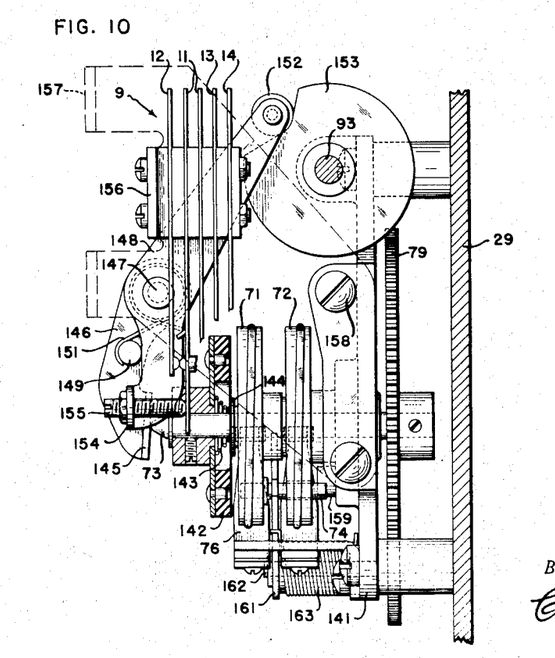
Figure 10 is a view partly in section taken from the right of Figure 9.

In Figures 9 and 10, there is shown a modification of the clutch and switch operating mechanism which may be used in place of that which has been previously described. In this case, the shaft 73 which supports the two rheostats 71 and 72 is rotatably mounted in a sub-frame 141 that is attached to the wall 29. The gear 79 which serves to adjust the standardizing resistance 3 is located between the frame 141 and the wall 29. This shaft 73 in addition to having the rheostat rotatably mounted on it, has a clutch disc 142 attached to its outer end. The clutch disc has built into it a spring 143 which bears at one end against the clutch disc and at the other end against an abutment 144 that is formed on the rheostat 71, the left face of which acts as the second clutch disc. In this fashion, the shaft 73, the clutch disc 142, and the gear 79 are resiliently pressed toward the left to keep the clutch open during normal operation of the instrument. The clutch is closed as the shaft 73 is moved to the right by means of a bent over portion 145 which engages the end of the shaft 73, and which forms part of a lever 146 that is pivoted on a stud shaft 147. Also pivoted to this shaft is a second lever 148 that is resiliently held in a given position relative to the lever 146 by means of engagement between a pin 149 that projects from the lever 146 and bears against the edge of lever 148. The levers are held in their relative position by means of the action of a spring 151 that acts on lever 148 and pin 149. The upper end of lever 148 is provided with a roller 152 that engages the surface of a cam 153 attached to the shaft 93.

During the normal operation of the potentiometer instrument, the roller 152 remains in a cut-out portion of the cam 153. When, however, the shaft 93 is rotated the lever 148 is moved in a counter-clockwise direction in Figure 10, and, through the action of spring 151 and pin 149, moves lever 146 in the same direction to shift shaft 73 to the right. This moves clutch disc 142 against the face of resistance 71 to close the clutch. This same operation of lever 148 serves to operate switch 9 to disconnect the thermocouple from the potentiometer circuit and to connect the standard cell in the circuit in its place. For this purpose, the lower end of lever 148 is provided with a bent over portion 154 through which a screw 155 is threaded. This screw bears against the long blade 11 of the standardizing switch 3. Normally speaking, the resiliency of the switch blade acting against the screw 155 maintains the lever in the position shown in which roller 152 bears against the cam 153. The switch in this case is mounted on a portion 156 of a plate 157 that is attached by screws 158 to the sub-frame 141. As shown in the drawings, the plate is in solid lines in Figure 9, but is shown only in outline by dotted lines in Figure 10. The reason for the showing in Figure 10 is so that the plate will not hide a large number of parts that that figure is intended to disclose.

This embodiment of the invention is also provided with a stop to limit the rotation of the resistances 71 and 72. The stop consists of a pin 159 which projects rearwardly from the support 141 into the path of the pin 74. When the resistances have rotated to one or the other of their limits, pin 74 will engage pin 159 to stop their rotation.

The operation of this standardizing arrangement is the same as that previously described. When the ratchet 117 has rotated sufficiently it will cause the pawl 98 to drive crank 96. This rotates shaft 93, and the cam 153 carried thereby. As the cam rotates it will move the lever 146, 148 in a counter-clockwise direction to simultaneously close the clutch and throw the standardizing switch to a position in which the standard cell is connected in the potentiometer circuit Upon the completion of a single rotation of shaft 93 the standardizing operation will be completed and the parts return to the position shown.

At times it may be desirable to have some indication as to the condition of the battery 2 so that the operator may know when this battery is to be renewed. For this purpose an indicator is provided which consists of a bell-crank lever 161 that is pivoted at 162 and normally biased in a counter-clockwise direction by a spring 163 to the position shown in Figure 9. As the battery 2 diminishes in strength, the resistance will be adjusted in a counter-clockwise direction in Figure 9 until such time as the pin 74 between the resistances engages the upper surface of the horizontal arm of lever 161. Continued rotation of the rheostats will thereafter cause arm 161 to move in a clockwise direction. When the arrow on the vertical portion of this arm is in line with the pointer 164 that is formed on the sub-frame 141, the operator will know that the battery should be renewed.

From the above description it will be seen that I have provided a simple means to periodically standardize a potentiometer circuit. With the structure disclosed, a timing mechanism consisting of a pawl and ratchet device is used to mechanically close a clutch and operate a switch to disconnect the thermocouple from the potentiometer circuit and simultaneously connect a standard cell in its place. Thereafter, operation of the instrument to balance itself will produce adjustment of a standardizing resistance to recalibrate the instrument. Although the operation is normally intended to be automatic, it can be initiated manually at any time by the operation of a button. Thereafter, the instrument will automatically operate the standardizing mechanism just as if it was operated by the timing device.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a potentiometer instrument of the self-balancing type the combination of means continuously operating when the potentiometer is unbalanced to rebalance the same, standardizing means for said potentiometer driven from said continuously operating means, a clutch imposed between said last two means, means to periodically operate said clutch comprising a constantly rotating member, a drive part carried thereby movable from operative to inoperative positions, a member to be rotated by said drive part when the latter is in its operative position, a clutch controlling means connected to said member, and means to move periodically said drive part into its operative position.

2. In a self-balancing type potentiometer instrument the combination of means to standardize the instrument comprising a constantly rotating member, a drive part movable from operative to inoperative positions carried by said member, a driven part operated by said drive part, means movable from a first position in which it is operative to move said drive part to its operative position to a second position in which it is operative to move said drive part to its inoperative position, periodically operated mechanism to move said movable means to its first position, and means forming part of said driven part to move said movable means to its second position.

3. In a self-balancing type potentiometer instrument, the combination of means to standardize the instrument comprising a clutch mechanism, means to bias said clutch to an open position, means to close said clutch including a driven part, a driving part movable from operative to inoperative position, periodically operated mechanism acting in one position to move said driving part to operative position so that it may operate said driven part and acting in a second position to move said driving part to inoperative position, and means forming a portion of said driven part to move said periodically operating mechanism to its second position.

4. In a self-balancing potentiometer instrument, the combination of means to standardize said instrument including a clutch normally biased to an open position, means to close said clutch including a rotatable driven part, a rotatable driving part movable from an operative to an inoperative position, means acting in one position to periodically move said driving part to its operative position whereby it will operate said driven part to close said clutch and permit standardizing of the instrument to take place and acting in a second position to move said driving part to inoperative position, and means forming part of said driven part to move said periodically moving means to its second position upon the completion of one revolution of the driven part.

5. In a self-balancing type potentiometer instrument having means to standardize the same including a clutch and a switch, means to simultaneously operate the clutch and switch including a rotating member acting upon a complete rotation of the same to complete a standardizing cycle, a crank having a pin projecting therefrom, connecting means between said crank and member, a rotatable drive pawl movable from a position in which it will engage said pin to rotate said crank to a position in which it will not engage said pin, means to move periodically said pawl to engaging position to start a standardizing cycle and means operated by said crank to move said pawl to inoperative position upon the completion of one revolution of said crank.

6. In a self-balancing potentiometer instrument having standardizing provisions, means to operate the standardizing provisions including driving and driven parts, said driving part being movable from a position in which it engages to a position in which it does not engage said driven part, a member to control the movement of said driving part into engaging position, latch mechanism for said member, and means to operate said latch including a rotating part, a pawl carried thereby and movable through a path intercepted by said latch, resilient means to bias said pawl to a predetermined position with respect to said rotating part, holding means to move said pawl relative to said rotating part as the latter is moving whereby said resilient means will be tensioned, continued rotation of said rotating part moving said pawl away from said holding means, the tension built up in said resilient means thereby serving to move said pawl against said latch with force enough to release the same.

7. In a self-balancing type potentiometer instrument comprising standardizing mechanism, the combination of means to operate said mechanism periodically comprising normally disengaged driving and driven parts, a member to produce engagement of said parts, latch mechanism to hold said member in inoperative position and means to release said latch mechanism comprising a moving part, a latch releasing device carried by said part and movable through a path intercepted by said latch, resilient means to bias said device to a given position relative to said part, means to hold said device relative to said part to tension said resilient means then release said device, the force of said resilient means being sufficient to cause said device to act on said member and release said latch.

8. In a self-balancing potentiometer instrument including standardizing mechanism, the combination of means including a latch mechanism to control the operation of said standardizing mechanism, a rotating member, a device carried on said member, resilient means to bias said device to a given position relative to said member, means to hold said device to tension said resilient means as said device moves through its path and then release said device whereby said resilient means will forceably move said device back to its given position relative to said member, said latch mechanism being located in the path of movement of said device as it moves to its given position to be actuated thereby.

9. In a self-balancing type potentiometer having a standardizing mechanism including a clutch and a switch, means to positively operate said clutch and switch in opposite directions comprising a pivoted lever biased in one direction in which the clutch is closed, means to move said lever in the opposite direction and hold it in a position in which the clutch is open, a rotatable part to operate said moving means, a driving part movable from a position in which it will operate said rotatable part to a position in which it will not operate said rotatable part, means to move periodically said driving part into operative position, and means operated by said rotating part upon the completion of a standardizing operation to move said driving part out of operative position.

10. In a self-balancing type of potentiometer having standardizing provisions, the combination of means to operate said standardizing provisions including a driven part, a driving part movable from a first position in which it engages said driven part to a second position in which it does not engage said driven part, a movable member operative to move said driving part from its second to its first position and back again, a latch to hold said member in a position in which it will move said driving part to its second position, periodically operated means and manually operated means to release said latch so said member may move to a position in which it will move said driving part to its first position, means operated by said driven part to move said member to a position in which it will move said driving part to its second position, and means to operate said latch to hold said member in its last mentioned position.

11. In a multiple self-balancing type potentiometer instrument adapted to make a series of records in sequence of the value of a plurality of conditions, a detecting member movable from a neutral position to a position on either side thereof, means operated by said detecting member when in its neutral position to make a record of the value of a condition, standardizing mechanism for said potentiometer instrument, means to operate periodically said standardizing mechanism, and means actuated by said means to operate said standardizing mechanism to hold said detecting member out of its neutral position while the standardizing operation is taking place.

12. In a multiple self-balancing potentiometer instrument having a recording mechanism operative to record sequentially the value of a plurality of conditions and having a standardizing mechanism operative to recalibrate the instrument, the combination of a detector member movable from a neutral position to a position on either side thereof, means actuated by said detecting member when in its neutral position to operate the recording mechanism to make a record, means to actuate the standardizing mechanism including a rotatable member which rotates during the standardizing operation, and means operated by said rotatable member to move said detecting member out of its neutral position while a standardizing operation takes place, whereby a recording operation may not occur during that time.

ALOYSIUS F. ALLWEIN.